United States Patent [19]
Schenkyr et al.

[11] Patent Number: 5,457,467
[45] Date of Patent: Oct. 10, 1995

[54] MULTIPLE ANTENNA SYSTEM WITH OUTPUT SIGNAL COMBINATION

[76] Inventors: Dieter Schenkyr, Lessingstr. 30, D-7312 Kirchheim; Walter Buck, Steinwaldstr. 90, D-7000 Stuttgart, both of Germany

[21] Appl. No.: 930,607
[22] PCT Filed: Dec. 6, 1990
[86] PCT No.: PCT/EP90/02114
§ 371 Date: Oct. 5, 1992
§ 102(e) Date: Oct. 5, 1992
[87] PCT Pub. No.: WO91/11830
PCT Pub. Date: Aug. 8, 1991

[30] Foreign Application Priority Data
Feb. 5, 1990 [DE] Germany ............ 40 03 385.6

[51] Int. Cl.$^6$ .................. H01Q 1/32; H04B 7/08
[52] U.S. Cl. ........................... 343/713; 343/711
[58] Field of Search ................. 343/713, 712, 343/711, 850, 853, 844; H01Q 1/32

[56] References Cited

U.S. PATENT DOCUMENTS

| | | | |
|---|---|---|---|
| 4,564,844 | 1/1986 | Bowering | 343/881 |
| 4,723,127 | 2/1988 | Ohe et al. | 343/712 |
| 4,788,549 | 11/1988 | Ohe et al. | 343/712 |
| 4,845,505 | 7/1989 | Ohe et al. | 343/713 |
| 5,177,494 | 1/1993 | Dörrie et al. | 343/767 |
| 5,177,495 | 1/1993 | Davies | 343/713 |

FOREIGN PATENT DOCUMENTS

| | | |
|---|---|---|
| 0325946 | 8/1989 | European Pat. Off. . |
| 3406684 | 9/1985 | Germany . |
| 3621117 | 1/1988 | Germany . |
| 8901792 | 5/1989 | Germany . |
| 3802131 | 8/1989 | Germany . |
| 3802130 | 8/1989 | Germany . |

OTHER PUBLICATIONS

Lindenmeier et al., "UKW–Rundfunkempfang im Auto", Jul., 1977 pp. 40–44, *Funkschau*, vol. 49, No. 16.
Meinke et al., *Taschenbuch der Hochfrequenztechnik*, 3rd ed., 1968, p. 496.

Primary Examiner—Donald Hajec
Assistant Examiner—Hoanganh Le
Attorney, Agent, or Firm—Robert J. Koch

[57] ABSTRACT

The antenna combination has at least two individual antennas which form part of at least one resonant circuit which appears on an electrically conductive surface. The output signals of the individual antennas are combined, for example, added. The antennas are preferably located at the edges of the electrically conductive structure. The antenna combination of the invention is particularly suitable for transmitting and receiving in vehicles because antennas which have transmitting and receiving properties equivalent or superior to those of rod and disc antennas can be built into the vehicle. The antenna combination can be used advantageously in a diversity process.

27 Claims, 3 Drawing Sheets

MULTIPLE ANTENNA SYSTEM WITH OUTPUT SIGNAL COMBINATION

BACKGROUND OF THE INVENTION

1. Field of the Invention

The invention relates to a combination of antenna having at least two individual antennae, whose output signals are combined.

2. Description of the Related Technology

Antenna combinations of this type are generally known and for example described in the book Meindke-Gundlach "Taschenbuch für Hochfrequenztechnik" (Paperback for High Frequency Technology), 3rd Edition 1968, Page 496. These antennae combinations function as one individual antenna. In contrast to individual antennae, they have a higher gain and a changed radiation pattern with a tune-out in different directions.

It is not always possible or satisfactory to use antenna combinations of this type. In particular, if antennae of this type are to be used in mobile devices, such as vehicles, they can then, if at all, only be used in special cases as passive arrangements. The reason for this lies in the fact that the type of antenna combinations which are fitted to increase the gain, perform tune-outs. In conjunction with mobile devices, such as vehicles, however, it must be possible to receive signals with the vehicle aligned in any direction relative to the point of transmission. It is in fact fundamentally possible to track the receiving beams electronically in such cases. The costs as far as the wiring is concerned are, however, extremely high for this and in many cases cannot be justified.

When designing the structure of antennae on vehicles, special pre-requisites and rules apply, which mainly prevent the optimum dimensioning of the antennae with regard to the level of efficiency and the gain. The rod antenna, which is nowadays the most widely used, does in fact have a good level of efficiency but comes under criticism owing to its tendency for corrosion and damage and owing to its air resistance.

Alternatively, antennae integrated in the chassis, for example antennae in the rear windscreen, review mirror or bumper, have only a low level of efficiency particularly owing to the short distance to the metal in the chassis. This leads to noticeable losses in the reception quality, which can in fact be somewhat improved by the use of active antennae, but is, however, on the other hand associated with high costs as far as the wiring is concerned. In this case, it is nevertheless impossible to transmit with antennae of this type.

SUMMARY OF THE INVENTION

The object of the invention is therefore to produce an antenna which is integrated in the vehicle and which has a sufficiently high level of efficiency and is not coupled to the passenger compartment.

Based on an antenna combination having at least two individual antennae, whose output signals are combined, the given object is achieved in accordance with the invention, in that the individual antennae are part of at least one substantially resonant electrical circuit occurring on an electrically conductive formed body.

On formed bodies made from metal, such as a car chassis or parts of a car chassis, but also on metal linings of flat roofs, on iron masts, tanks etc., antennae are always only part of a whole arrangement effective for receiving or transmitting. If a wave hits the electrically conductive formed body, possibly the surface of the vehicle or another special electrically conductive structure, superposed currents are formed there depending upon the wave length and the angle of incidence, and a combined electrical field to the vehicle or the structure of the metallic formed body.

It is possible by means of resonance effects to intensify considerably the currents and fields locally.

With current resonances, the surface current is connected to the electrical circuit by way of the di-electric displacement current. This current emerges at the end of the electrically conductive formed body located in the current resonance and at these points leads to an electric field intensity. In this connection, in order to improve the level of efficiency of the antenna combination, the fact is used in accordance with the invention, to the effect that the displacement current occurring at an end region is part of the same electrical circuit as the current emerging at the other end region.

By means of the feature in accordance with the invention, the individual antennae, which are to be disposed as part of at least one substantially resonant electrical circuit occurring on an electrically conductive formed body, produce a very good level of antenna efficiency, so that in connection with vehicle antennae the level of efficiency of rod antennae is achieved and exceeded. The radiation pattern is only affected insignificantly by this.

The antenna combination in accordance with the invention—as mentioned—is not only suitable for vehicles but also generally in connection with all metallic formed bodies, e.g. flat roofs with metal fittings, iron masts, tanks etc. As is known, metal surfaces can by means of resonant surface currents considerably change or falsify the pattern of an antenna located nearby. In such cases, it is therefore possible to utilize the surface currents as an antenna according to the principle in accordance with the invention, as in this way a uniform radiation pattern can be achieved. It is advantageous to utilize the antenna combination in accordance with the invention, preferably in the event of rough and extreme environmental conditions, such as when there is a danger of an overvoltage.

The features in accordance with the invention are then particularly advantageous if the individual antennae are shortened antennae.

In particular with bumper-, windscreen- and rear-view mirror-antennae it is, in contrast to the rod antenna, not possible to produce even only approximately an optimum antenna length, which corresponds approximately to a quarter wave length of the radiation to be received or transmitted because integrated antennae of this type are not situated far enough away from the motorcar body sheet. The effect and advantage achieved with the features in accordance with the invention are therefore particularly high, precisely with this type of integrated antennae.

In accordance with a preferred embodiment of the invention, the resonance frequency and/or an uneven plurality of same correspond substantially to a frequency in the frequency band of a transmitting and/or receiving signal. The arrangement of the individual antennae and/or the selection and design of the electrically conductive formed body for the purpose of producing this preferred embodiment facilitate a further optimization of the transmitting and/or receiving characteristics of the antenna combination in accordance with the invention.

Formed bodies, which are capable of resonance, have characteristics which reoccur periodically with the frequency. The antenna combination in accordance with the invention is therefore also sensitive for several frequency ranges separated by a gap in the frequency, by means of suitably selected arrangements and a suitably selected construction. The antenna combination in accordance with the invention is therefore suitable also for multiple use such as, for example, in connection with antenna combinations for vehicles both for radio reception and also for mobile radio and any other radio application.

An advantageous embodiment exists in that the antenna combination is utilized for several reception ranges which are each separated by a gap in the frequency. It is therefore possible, without any further expenditure, to receive and transmit signals in different receiving and transmitting ranges using the same antenna combination.

It is advantageous if at least two spaced individual antennae are disposed in a horizontal plane, for example in a bumper, on the edge of a vehicle roof, of a trunk lid or an engine hood. An antenna combination of this type is particularly suitable for receiving, as the waves radiated by radio transmitters are substantially horizontally polarised. When receiving or transmitting signals, whose waves are polarised in a vertical direction, such as is normal for example with mobile radio, it is advantageous if at least two individual antenna are provided spaced away from each other in a perpendicular direction. The individual antenna can for example be antennae in the form of insulated trims.

It is particularly advantageous, if at least two of the individual antennae are disposed at a distance of substantially half the resonance wave length.

In accordance with a particularly advantageous embodiment of the invention, the individual antennae are fitted on the edges of electrically conductive formed bodies.

As is known, the electrical field is intensified on edges, so that even with the traditional application of rod antennae, a particularly good level of efficiency in the antennae occurs on the chassis edges. The edge effect which is simultaneously present, i.e. the presence of a strong concentration of field intensity on the edges and of a current resonance produce a particularly good level of efficiency in the antenna combination in accordance with the invention. In connection with vehicle antennae, this also applies to the 3 meter wave range, i.e. for the VHF radio reception, if, for example bumper-antenna combinations are used, where the individual antennae are fitted to the corners of the bumpers. As the width of a vehicle, in particular a passenger car, lies in the region of 1.5 m, the current resonance is produced. The level of efficiency of this type of antenna combinations lies in the range of traditional rod antennae, without the disadvantages of said rod antennae.

The antenna combination in accordance with the invention can generally also in connection with vehicles, advantageously be used if the electrically conductive formed body is part of a vehicle chassis and the individual antennae are vehicle antennae. In accordance with the already mentioned embodiment of the invention, according to which, at least two individual antennae are disposed at a distance apart of substantially half the resonance wave length, the individual antennae of the antenna combination in accordance with the invention, can be attached at any two places away from each other on the vehicle, the two places being approximately half the length of the resonance wave away from each other. It is particularly advantageous if at least two individual antennae are disposed on the corners or edges of a bumper, of a vehicle roof, of a trunk lid and/or an engine hood. In this way, it is also possible to utilize the effect of the edges for the current resonance. The $\lambda/2$ condition for the current resonance, however, requires at the same time only to be maintained roughly, in order to achieve a sufficient level of efficiency in the antennae. Generally, the mechanically measurable resonator lengths need not correspond to the electrical.

In accordance with an extremely advantageous embodiment of the invention, the output signals of the individual antennae are added substantially in phase opposition. The output signals are added in the known manner by means of traditional active circuit arrangements or other adders.

The individual antennae are advantageously connected by way of a phasing line, preferably a $\lambda/2$ phasing line and in this way the antennae signals are added in phase opposition. The power consumption then occurs in the low end of the two sub-antennae.

Owing to the antenna signals being fed-in in phase opposition into the $\lambda/2$ line, this functions outside the midband frequency as a parallel resonance circuit, which lies parallel to the antenna low ends. The parallel resonance circuit can be used advantageously with series circuit behavior for compensating the blind parts of receiving antennae, if the wave resistance is suitably selected. It is particularly advantageous, if the phasing line has a wiring which functions for the common-mode and/or push-pull signals. In particular, when the phasing line, preferably the $\lambda/2$ phasing line, by reason of the selected or possible distances of the individual antennae from each other, or with regard to the frequencies to be received and transmitted, differs from the half wave lengths of the signals, it is possible for the combination effect to be maintained or improved by means of a suitable common-mode and/or push-pull circuit, as is known per se.

A further embodiment of the invention resides in the parallel connection of at least two individual antennae for low frequencies. This is advantageous particularly with low frequencies, which are smaller than 10% of the operating frequency, as the $\lambda/2$ phasing line loses it phase-shifting effect. The parallel connection produces an optimum antenna effect for a low frequency range, so that a VHF antenna can be utilized, for example, for also receiving long, medium and short wave transmitters.

The level of efficiency of the antennae is improved, if the necessary connections to the mass are selectively made for the individual antennae. This measure is particularly advantageous for a high frequency range, as in this case cable capacitances which cause interference, are reduced and the efficiency at low frequencies improved.

Advantageously, n individual antennae are fitted, whose signals are combined to m antenna combinations, preferably added, and $n/2 < m \leq n$. In principle, it is possible to form just as many combination antennae from each multi-antennae arrangement with n individual antennae, which, for example, can be used for a diversity method.

A particularly advantageous embodiment of the antenna combination in accordance with the invention resides in that the individual antennae are part of a diversity antenna combination. It is also particularly advantageous if the individual antennae and/or the antenna combinations are part of an antenna selection diversity system.

At least one of the individual antennae is advantageously fitted for at least two of the pair groupings. This means that, by means of simultaneously utilizing a sub-antenna in several pair groupings, it is possible to have a greater number of diversity input signals without correspondingly increasing the number of individual antennae. It is then advantageous to utilize simultaneously a sub-antenna in several pair groups particularly if the individual antennae in each case are part of different resonant electrical circuits. In this case, it is no longer inevitable that the output signals of the sub-antennae are added in phase opposition.

At least one of the individual antennae can also be a rod antenna, a windscreen antenna and/or a mirror antenna. The individual antennae connected to each other need not in fact be of the same type. In particular, in contrast to a windscreen antenna as an individual antenna, this has the advantage that the electrical circuit is not connected by way of the vehicle interior and thus it is possible to avoid the undesired coupling to the passenger compartment. This applies more so when transmitting.

It is particularly advantageous, if more than two individual antennae are combined, to form one antenna by means of adders weighted with complex factors for the output signals of the individual antennae. As is explained in detail in the following by way of an example, it is possible in this way to access the resonant currents with a greater mode number.

PREFERRED EMBODIMENT OF THE CLAIMED INVENTION

Figure 1:
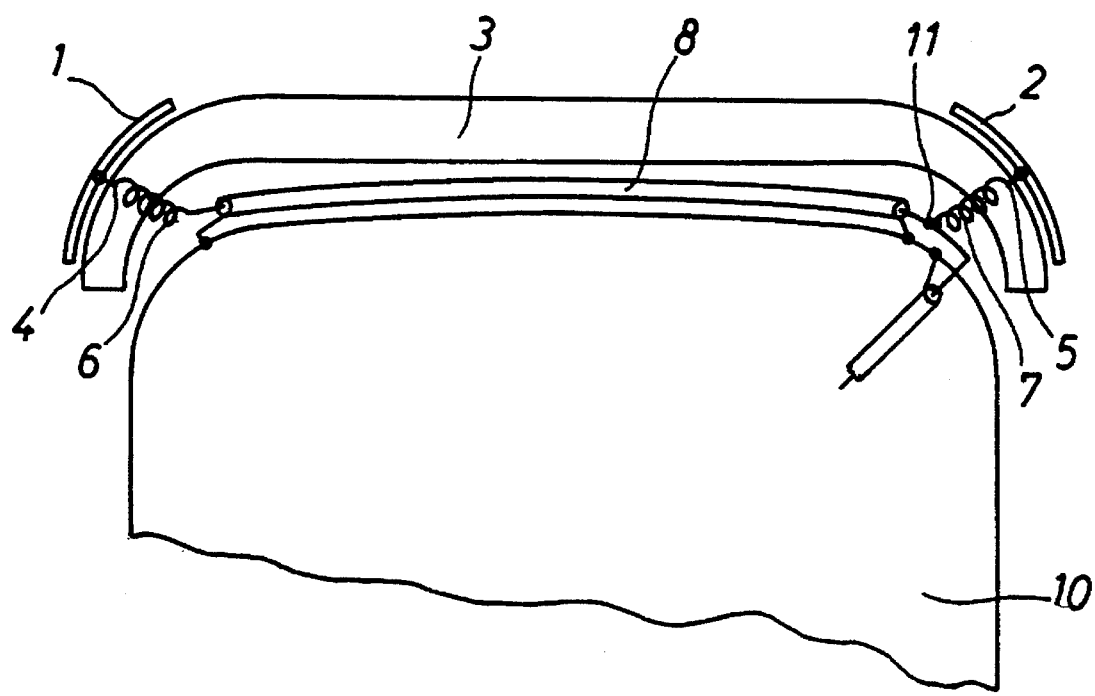
FIG. 1 is a schematic arrangement of an embodiment of the antenna system in accordance with the invention.

FIG. 1 illustrates two individual antennae 1 and 2, which are fitted at a distance away from each other on the edges of a vehicle bumper 3 comprising a non-conductive material, the distance corresponding to approximately the width of the vehicle. In each case, down-leads 4 and 5 and, if necessary, extension coils 6 and 7, are fitted approximately in the middle of the horizontal ends of the individual antennae 1 and 2. The down-leads 4 and 5 or preferably the extension coils 6 and 7 are connected at the ends facing away from the individual antennae 1 and 2 by the respective end of a λ/2 phasing line 8, whose earth or preferably shielding line is connected to the motorcar body sheet 10. The signal from the antenna system comprising the two individual antennae 1 and 2 is picked up at the low end 11 of one of the two individual antennae 1 and 2 and directed to a receiving circuit (not illustrated).

In this embodiment, the electrically conductive formed body is the motorcar body sheet 10, on which is formed a resonant electrical circuit in particular for the receiving waves, which lie in a wave length range of 3 m, as a vehicle width and therefore, the length of the bumper, amounts to approximately 1.5 m, which corresponds to half the wave length of this wave length range. Furthermore, by attaching the individual antennae 1 and 2 to the edges of the bumper 3, it has the effect that the concentration of field intensity is precisely at this point particularly large by reason of the effect of the edge. This edge effect in conjunction with the electrical resonance facilitates a particularly good level of antennae efficiency for the antenna combination of this design in accordance with the invention.

Figure 2:
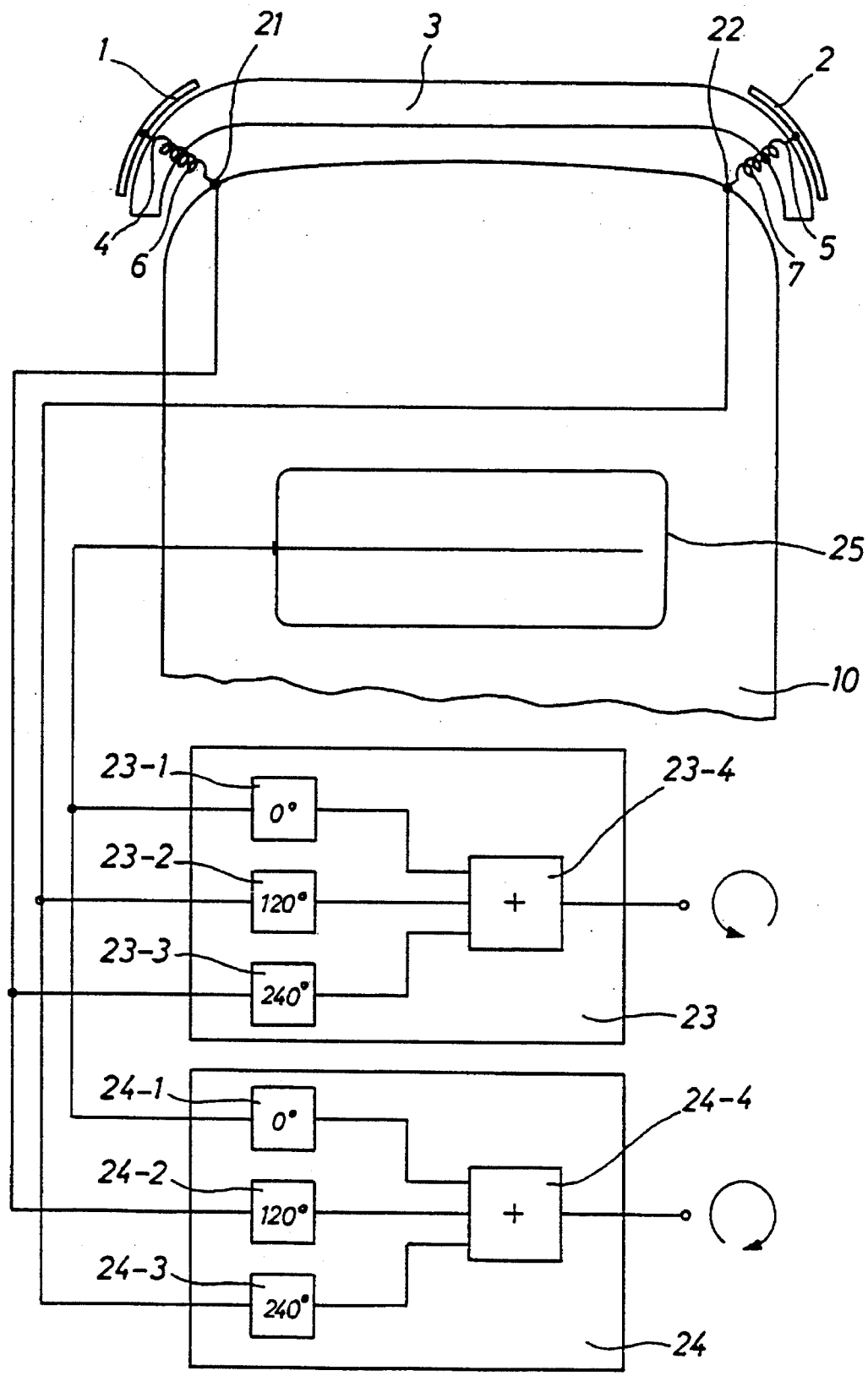
FIG. 2 is a further embodiment of the invention.

In the further embodiment of the invention, illustrated schematically in FIG. 2, the rear part of a car is illustrated from above, and parts which correspond to those parts of FIG. 1 are designated by the same reference numbers. Two individual antennae 1 and 2 disposed on the edges of the bumper 3 are again connected by way of corresponding down-leads 4 and 5 or preferably extension coils 6 and 7 to the vehicle chassis 10. The output signals of the individual antennae 1 and 2 are picked up at the antenna low ends 21, 22 and in each case fed to an antenna signal processing circuit 23 and 24. Furthermore, a windshield antenna 25 is fitted which is disposed in the rear windshield. The windshield antenna 25 is similarly connected in each case to the antenna signal processing circuit 23 and 24.

The output signal of the antenna 1 picked up at the antenna low end 21 is, on the one side, fed to a 240° phase shifter 23-1 of one antenna signal processing circuit 23 and, on the other side, to a 120° phase shifter 24-1 of the other antenna signal processing circuit 24, against which the antenna low end 22 of the other individual antenna 2 of the bumper 3 is connected to a 120° phase shifter 23-2 of one antenna signal processing circuit 23 and to a 240° phase shifter 24-3 of the other antenna signal processing circuit 24. Finally, the output signals of the windshield antenna 25 are in each case fed directly to the antenna signal processing circuits 23 and 24. The output signals of the respective phase shifters 23-1, 23-2 and 23-3 and 24-1, 24-2 and 24-3 are in each case made available to an adding circuit 23-4 and 24-4 of the antenna signal processing circuits 23 and 24. As is indicated at the output of the antenna signal processing circuits 23 and 24, the two individual bumper antennae 1 and 2 and the windshield antenna 25 are therefore connected together in such a way that the counter-clockwise and clockwise rotating mode of a ring current is excited. Two antenna combinations having different radiation patterns are therefore available for a diversity system.

Figure 3:
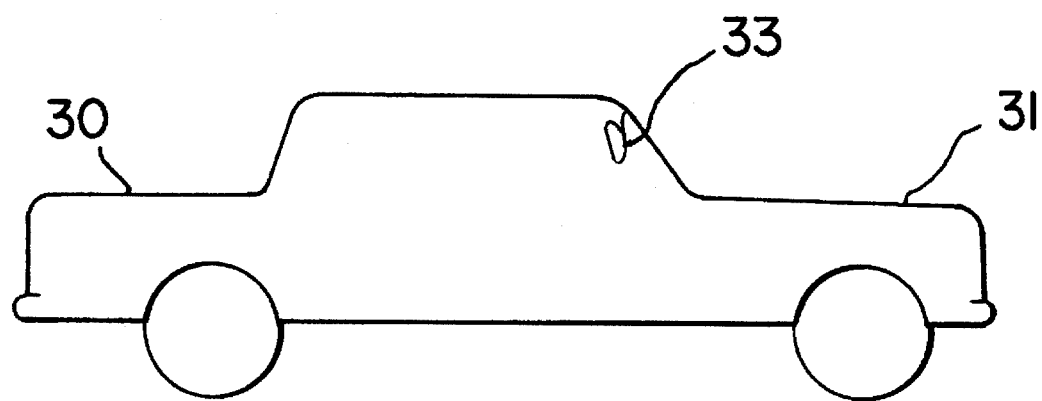
FIG. 3 is a schematic of certain potential antenna bodies.

The current invention is explained by way of preferred embodiments. The person skilled in the art, however, is able to carry out numerous modifications and embodiments, without abandoning the idea of the invention. For example, in connection with the embodiment illustrated in FIG. 2, more than two or three antennae can also be connected together by means of corresponding adder circuits dimensioned to the receive mode, in order to excite rotating fields and ring currents of the most differing forms on electrically conductive formed bodies, such as for example a trunk lid 30 or an engine hood 31 or a mirror antenna 33 as shown in FIG. 3. In principle, it is possible to form just as many combination antennae from each arrangement of multi-antennae having n individual antennae and utilize them for a diversity method.

We claim:

1. An antenna combination comprising:

at least two individual antennae;

a phasing line; and an electrically conductive formed body, wherein, the electrically conductive formed body is configured to generate at least one substantially resonant electrical surface current, the at least two individual antennae are mounted proximally to the electrically conductive formed body and positioned to receive the same displacement current associated with the surface current of the electrically conductive formed body, the frequency of the surface current corresponds substantially to the frequency band of transmitting or receiving signals, and the individual antennae are configured to add the signals via the phasing line.

2. An antenna combination according to claim 1, wherein the lengths of said individual antennae are shorter than a quarter wavelength of the transmitting or receiving signals.

3. An antenna combination according to claim 1, wherein a resonance frequency of said antennae substantially corresponds to a frequency in the frequency band of the transmitting or receiving signals.

4. An antenna combination according to claim 3, wherein at least two of the individual antennae are situated at a distance of substantially half a resonance wave length from each other.

5. An antenna combination according to claim 1, wherein a resonance frequency of said antennae substantially corresponds to an uneven plurality of frequencies in the frequency band of the transmitting or receiving signals.

6. An antenna combination according to claim 1, wherein said antenna combination is configured for several receiving or transmitting ranges, each separated from the others by a frequency gap.

7. An antenna combination according to claim 1, wherein at least two of the individual antennae are fitted at a distance away from each other in a horizontal plane.

8. An antenna combination according to claim 1, wherein at least two of the individual antennae are fitted at a distance away from each other in a perpendicular direction.

9. An antenna combination according to claim 1, wherein said individual antennae are fitted on edges of said electrically conductive formed body.

10. An antenna combination according to claim 9, wherein said electrically conductive formed body is part of a vehicle chassis and said individual antennae are vehicle antennae.

11. An antenna combination according to claim 10, wherein at least two of the individual antennae are situated on a part of a vehicle wherein said part is selected from the group consisting of bumpers, vehicle roofs, trunk lids and engine hoods.

12. An antenna combination according to claim 11, wherein at least one of said individual antennae is selected from the group consisting of rod antennae, windshield antennae and mirror antennae.

13. An antenna combination according to claim 10, wherein at least one of said individual antennae is selected from the group consisting of rod antennae, windshield antennae and mirror antennae.

14. An antenna combination according to claim 10, wherein said individual antennae are spaced at a distance from each other and are configured as insulated, electrically conductive chassis trims.

15. An antenna combination according to claim 1, wherein output signals of said individual antennae are added substantially in phase opposition.

16. An antenna combination according to claim 15, wherein said phasing line is parallel to an edge of the electrically conducting formed body.

17. An antenna combination according to claim 16, wherein said phasing line is a $\lambda/2$ phasing line.

18. An antenna combination according to claim 16, wherein said phasing line is a coaxial line.

19. An antenna combination according to claim 16, wherein said phasing line has a wiring configured for common-mode signals.

20. An antenna combination according to claim 16, wherein said phasing line is displaced close to a motorcar body sheet.

21. An antenna combination according to claim 16, wherein said phasing line has a wiring configured for push-pull signals.

22. An antenna combination according to claim 1, wherein said individual antennae are connected in parallel for low frequencies.

23. An antenna combination according to claim 22, wherein a connection to earth is connected to one or more of said individual antennae.

24. An antenna combination according to claim 1, wherein n individual antennae are fitted, whose signals are combined into m antennae combinations, and $n/2 < m \leq n$.

25. An antenna combination according to claim 24, wherein said antenna combinations are part of a diversity antenna system.

26. An antenna combination according to claim 24, wherein said antenna combination and said individual antennae are part of an antenna selection diversity system.

27. An antenna combination according to claim 1, wherein output signals of more than one of said individual antennae are combined with an output signal of another of said individual antennae by an adder weighted with complex factors.

* * * * *